United States Patent [19]

Yamazaki et al.

[11] Patent Number: 4,866,528
[45] Date of Patent: Sep. 12, 1989

[54] IMAGE PICKUP APPARATUS PROVIDING LESSENED FLICKER IN ELECTRONIC STILL CAMERAS AND THE LIKE

[75] Inventors: Yasuyuki Yamazaki, Saitama; Akira Suga, Tokyo, both of Japan

[73] Assignee: Canon Kabushiki Kaisha, Tokyo, Japan

[21] Appl. No.: 144,257

[22] Filed: Jan. 14, 1988

[30] Foreign Application Priority Data

Jan. 19, 1987 [JP] Japan .................................. 62-8072

[51] Int. Cl.⁴ ............................................. H04N 3/14
[52] U.S. Cl. ........................... 358/213.22; 358/213.19
[58] Field of Search ...................... 358/213.19, 213.22, 358/213.26, 909

[56] References Cited

U.S. PATENT DOCUMENTS

| | | | |
|---|---|---|---|
| 4,117,514 | 9/1978 | Terui et al. | 358/213.26 |
| 4,593,312 | 6/1986 | Yamazaki | 358/213.19 |
| 4,597,013 | 6/1986 | Matsumoto | 358/213.26 |
| 4,603,355 | 7/1986 | Yamada et al. | 358/213.22 |
| 4,707,744 | 11/1987 | Kimata et al. | 358/213.26 |

Primary Examiner—Jin F. Ng
Assistant Examiner—Stephen Brinich
Attorney, Agent, or Firm—Robin, Blecker, Daley & Driscoll

[57] ABSTRACT

In the electronic still camera capable of field reading or frame reading and having a solid state image pickup element composed of a plurality of photosensitive elements arranged adjacent to each other, in reading, the electric charges of the odd numbered rows in the vertical direction of photosensitive elements and the electric charges of the even numbered rows of photosensitive elements are simultaneously cleared, and means are provided for shifting the clearings of the electric charges of the odd numbered rows of photosensitive elements and the electric charges of the even numbered rows of photosensitive elements from each other in time by one vertical scanning period in reading.

33 Claims, 5 Drawing Sheets

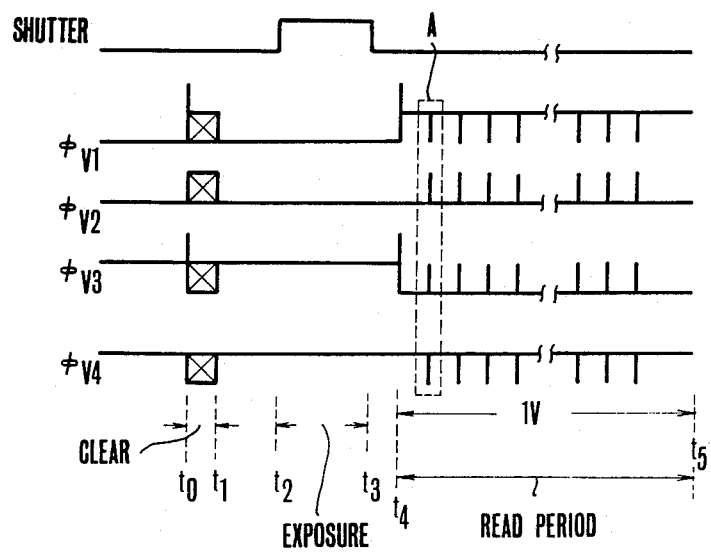
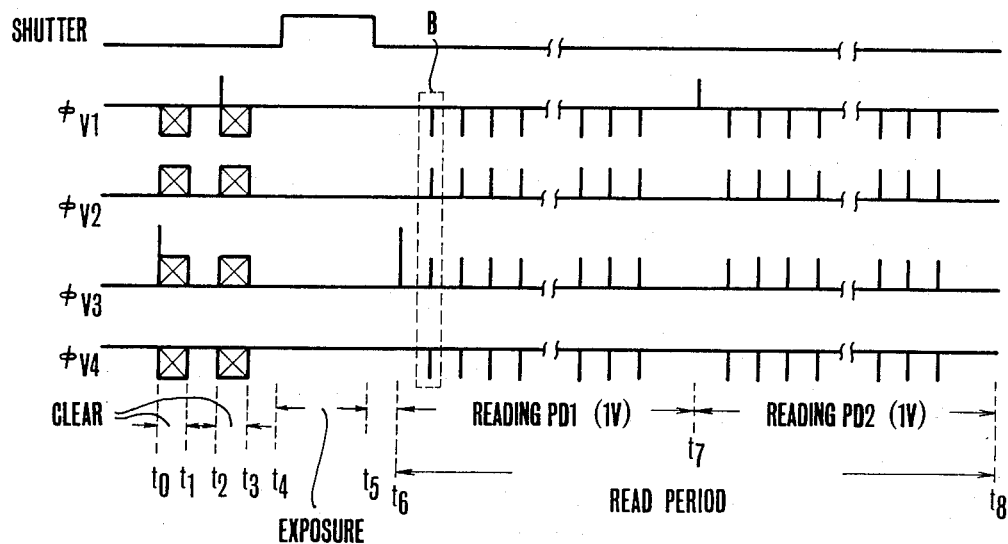

IMAGE PICKUP APPARATUS PROVIDING LESSENED FLICKER IN ELECTRONIC STILL CAMERAS AND THE LIKE

BACKGROUND OF THE INVENTION

1. Field of the Invention:

This invention relates to electronic still cameras having a solid state image pickup element comprised of a plurality of photosensitive elements capable of field readout or frame readout and arranged adjacent to each other.

2. Description of the Related Art:

FIG. 1 is a diagram illustrating the circuit structure of an inter-line transfer CCD 1 which is used in the conventional electronic still camera. In the FIG., 13, 14 are respective photo-diodes for converting photo-signals to electric charges. 15 is a vertical transfer CCD (hereinafter referred to as V-CCD) for transferring the electric charges vertically. 16 is a horizontal transfer CCD (hereinafter referred to as H-CCD) for reading out the electric charges horizontally. The electrical charges are converted to voltages by an output amplifier 17. Also, 18 is terminals at which vertical transfer pulses of four phases for driving the V-CCD 15 enter. 19 are a terminal at which a horizontal transfer pulse for driving the H-CCD 16 enters. Upper and lower drains 20 and 21 for clearing the electric charges include gates for selectively clearing the electric charges.

In FIG. 1, of the input terminals 18 for the vertical transfer pulses, the terminals $\phi_{V1}$ and $\phi_{V3}$ also serve as transfer gate electrodes from the photo-diodes 13 and 14 to the V-CCD 15, and are driven by pulses of such three values as shown in FIG. 2. That is, when the pulses $\phi_{V1}$ and $\phi_{V3}$ become $+V$, the gates open and electric charges transfer from the photo-diodes 13 and 14 to those electrodes in the V-CCD 15 to which the pulses $\phi_{V1}$ and $\phi_{V3}$ are applied. After that, the usual 4-phase drive pulses $\phi_{V1}$-$\phi_{V4}$ each are applied between 0 and -V shown in FIG. 2 to perform vertical transfer of the electric charges.

In such a conventional device as has been described above, when reading a frame, the time from the clearing to the reading of each photosensitive element differs between the adjacent upper and lower photosensitive elements each, by which difference is produced in the amount of dark current stored in each and the degree of unevenness. Therefore, there was a problem in that a flicker phenomenon and an unnatural image were produced.

SUMMARY OF THE INVENTION

This invention has been made to solve such a conventional problem, and its object is to provide an electronic still camera in which there is no difference in brightness between the upper and lower adjacent picture elements of an image-picked-up image, and an image signal having no flicker effect produced and freed from an unevenness can be obtained.

To achieve the above-described object, an embodiment of this invention has an arrangement that when reading a field, the electric charges of the above-described photosensitive elements arrayed in the odd numbered rows to the above-described vertical direction and of the above-described photosensitive elements arrayed in the even numbered rows are simultaneously cleared, and means is provided that when reading a frame, the electric charge clearings of the photosensitive elements arrayed in the odd numbered rows to the vertical direction and of the photosensitive elements arrayed in the even numbered rows are shifted from each other in time by one vertical scanning period.

By having the above-described arrangement, in the drive timing of the frame reading, the interval between the clearing of the photosensitive elements arrayed in the adjacent upper part and the clearing of the photosensitive elements arrayed in the adjacent lower part is made to be one vertical scanning period, thereby it being made possible that the times from the clear to the readout of the respective photosensitive elements are equal to each other.

Other objects and features of the present invention will become apparent from the following described specification and drawings.

BRIEF DESCRIPTION OF THE DRAWINGS

FIG. 4 is a timing chart illustrating the timing of field reading of a first embodiment of the invention.

FIG. 7 is a drive timing chart of frame reading of the above-described first embodiment.

DETAILED DESCRIPTION OF THE PREFERRED EMBODIMENT

Figure 3:
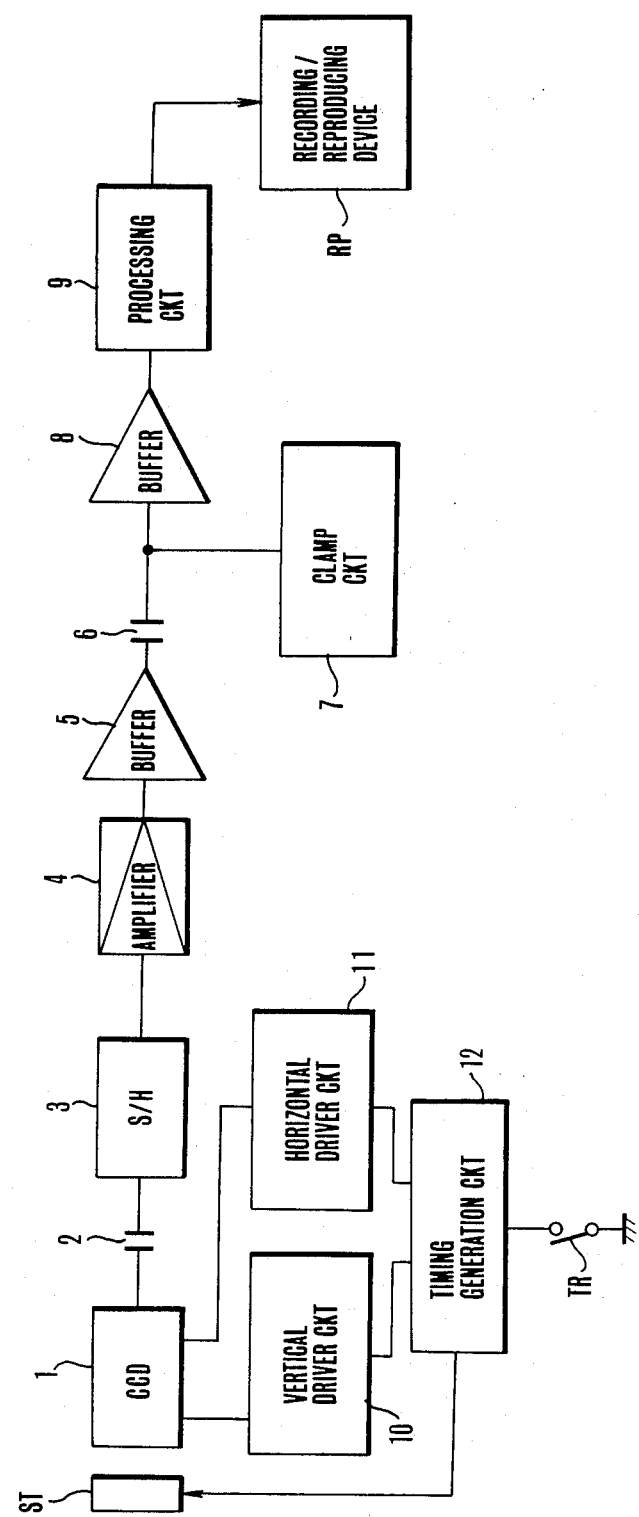
FIG. 3 is a block diagram of an electronic still camera in this invention.

FIG. 3 shows a block diagram of the electronic still camera in this invention.

Figure 1:
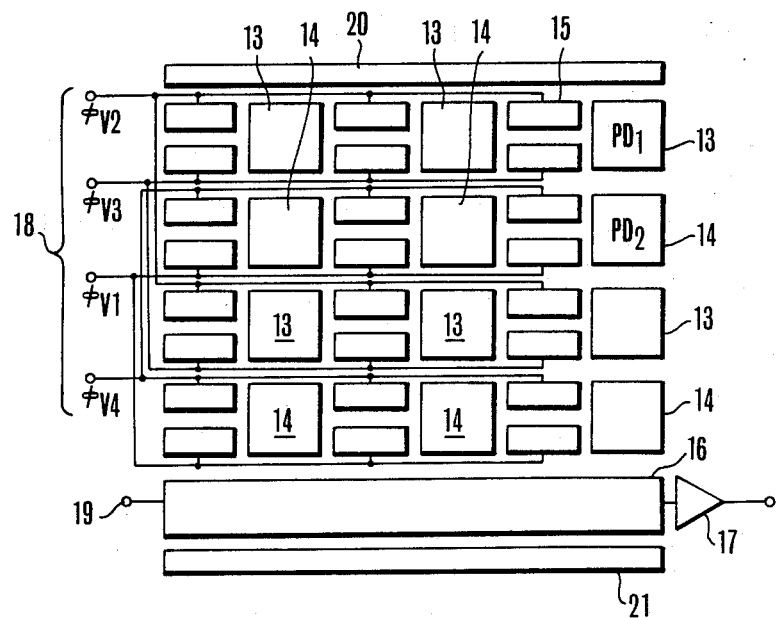
FIG. 1 is a diagram illustrating the circuit structure of the inter-line transfer CCD used in the electronic still camera.
Figure 2:
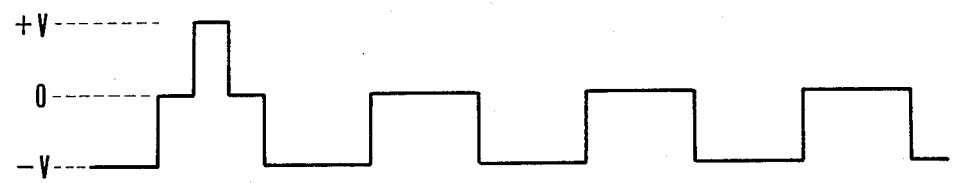
FIG. 2 is a diagram illustrating the transfer pulse for the electric charge from the photo-diode to the V-CCD.

In the figure, ST is a shutter; 1 is an interline transfer CCD as shown in FIG. 1; 2 is a capacitor. A photo-signal is converted to a voltage by the CCD 1. By a sample-hold circuit 3, clock leak is removed. The potential of the signal is fixed to a predetermined potential by a clamp circuit 7 through an amplifier 4, a buffer 5 and a capacitor 6. It is supplied as the output signal to a processing circuit 9 where it undergoes gamma correction or like correction, being converted to a video signal, and further to a recording and/or reproducing device RP where it is recorded or reproduced.

Also, the CCD 1 is driven by the vertical transfer pulse outputted from the vertical driver circuit 10 and the horizontal transfer pulse outputted from the horizontal driver circuit 11 formed on the basis of the timing pulse made by the timing generating circuit 12. TR is a trigger button.

In the following, the first embodiment of the timings of field reading and frame reading by the driver circuit 10 is explained.

Figure 5:
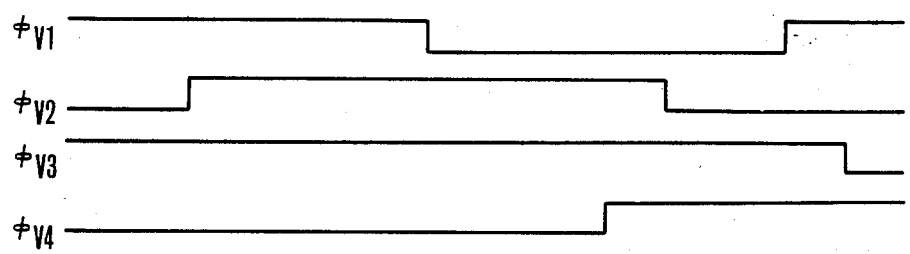
FIG. 5 is a diagram in an enlarged scale illustrating a part A enclosed by dashed lines of FIG. 4.

FIG. 4 is a timing chart illustrating the timing of field reading, FIG. 5 is a diagram showing in enlarged scale the part A enclosed by the dashed lines in FIG. 4. When the pulse is applied in such a timing as shown in FIG. 5, a potential gradient necessary to transfer electric charges is realized, and the electric charges of the V-CCD 15 are transferred vertically downward.

Figure 6:
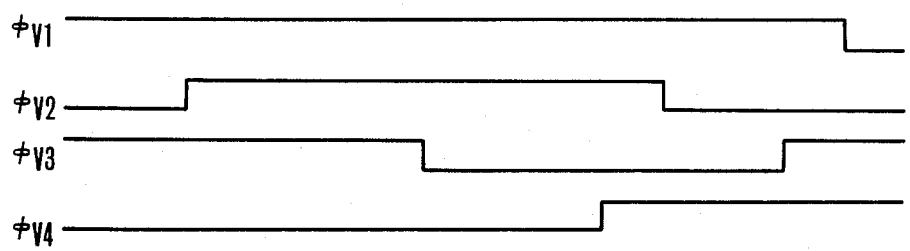
FIG. 6 is a diagram illustrating the vertical transfer pulse for reverse transfer of field reading.

Also, the timing of the transfer pulse is changed as shown in FIG. 6, the electric charges of the interior of the V-CCD 15 can be reversely transferred.

In the field reading of FIG. 4, in accompaniment with the actuation of the trigger button TR, at a time $t_0$ before an exposure, the photo-diodes 13 and 14 are simultaneously cleared. In an interval until a time $t_1$, the V-CCD 15 is cleared. In FIG. 4, by reversely transferring the electric charges of the photo-diode 13 to the upper drain 20, the clearing is performed. But, of course, an electric charge transfer to the lower drain 21 may be performed by the normal transfer. Further, after the exposure, at a time $t_4$, the electric charges of both of the photo-diode 13 and the photo-diode 14 are applied and read out in a read period.

Figure 8:
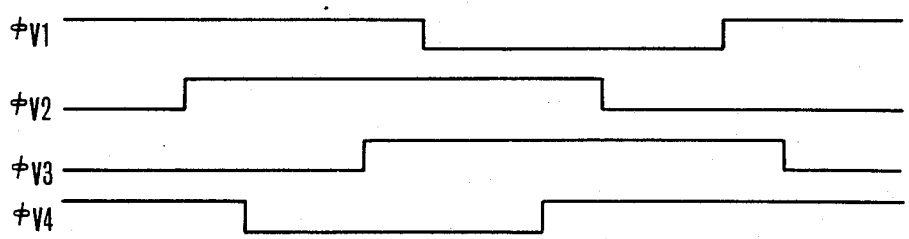
FIG. 8 is a diagram in enlarged scale of a part B enclosed by dashed lines of FIG. 7.
Figure 9:
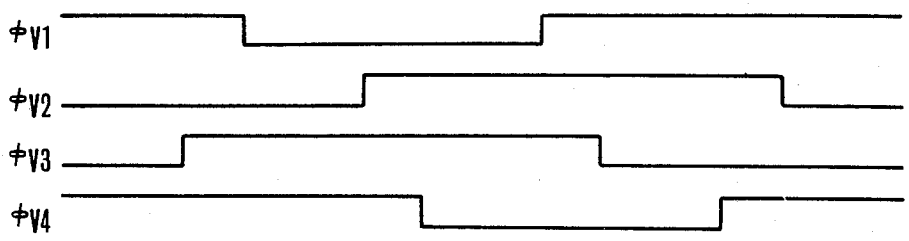
FIG. 9 is a diagram illustrating the vertical transfer for reverse transfer of frame reading.

Further, timing of the frame reading may be as in FIG. 7. An enlarged diagram of the portion B enclosed by the dashed lines in FIG. 7 is shown in FIG. 8. In the case of FIG. 8 also, the electric charges are transferred vertically downward likewise as in the field reading. With timing as FIG. 9, reverse transfer can be performed.

In FIG. 7, in accompaniment with the actuation of the trigger button TR, at the time $t_0$ before an exposure, the electric charge of the photo-diode 13, and at a time $t_2$ the electric charge of the photo-diode 14 are respectively cleared by the reverse transfer. In this case also, clearing of both may be performed by the normal transfer. Likewise as the field reading of FIG. 4, the signals of the photo-diodes 13 and 14 may also be simultaneously cleared. And, in the read period, from a time $t_6$, the signal of the photo-diode 13 is read. Subsequently, from a time $t_7$, the signal of the photo-diode 14 is read. With timing, the time from the clearing ($t_0$) of the electric charge in the photo-diode 13 to the read start ($t_6$) and the time from the clearing ($t_2$) of the electric charge in the photo-diode 14 to the read start ($t_7$) differ by nearly one vertical period (1V). Therefore, as to the amounts of dark current collected respectively in the photo-diodes 13 and 14 during that time, the photo-diode 14 amount is more than the photo-diode 13 amount.

Figure 10:
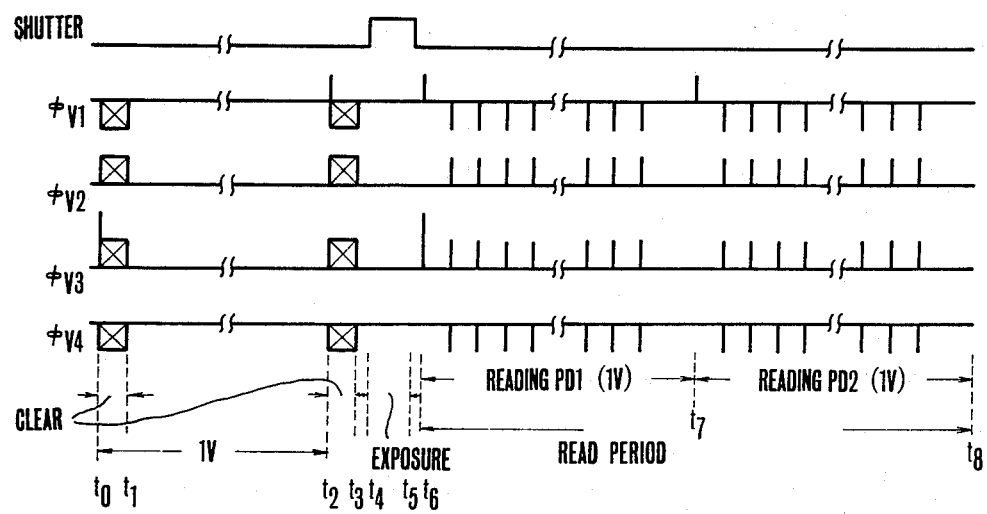
FIG. 10 is a drive timing chart in frame reading of the inter-line transfer CCD for an electronic still camera in a second embodiment of this invention.

FIG. 10 follows a second embodiment of this invention which can solve the identified problem and shows a timing chart of the drive pulses of the drive circuit 10 in the frame read mode of the inter-line transfer CCD for the electronic still camera. In accompaniment with the actuation of the trigger button TR, at the time $t_0$, the pulse $\phi_{V3}$ becomes $+V$, by which the electric charge of the photo-diode 13 is transferred to the V-CCD 15, and reversely transferred in the timing of FIG. 6 at a high speed and cleared. Also, the clearing may be performed by the normal transfer in the timing of FIG. 9 at the high speed. At the time $t_2$, the electric charge of the photo-diode 14 is cleared in a similar way. During a period from a time $t_4$ to $t_5$, the shutter ST opens, and electric charges are accumulated on the photo-diodes 13 and 14. And, during one vertical period (1V) from a time $t_6$ to $t_7$, the electric charge of the photo-diode 13 is transferred in the vertical direction in the timing of FIG. 5, read out to the H-CCD 16, then during 1V from a time $t_7$ to $t_8$, the electric charge of the photo-diode 14 is read out likewise.

In the embodiment of FIG. 10, by making the interval from the clearing ($t_0$) of the electric charge of the photo-diode 13 to the clearing ($t_2$) of the electric charge of the photo-diode 14 to be 1V, the time from the clearing of the electric charge of the photo-diode 13 to the readout and the time from the clearing of the electric charge of the photo-diode 14 to the readout can be equalized to each other. By this fact, the drawback of the first embodiment, that is, that in the photo-diode 13 and the photo-diode 14, the time from the clearing of the electric charge to the readout differs so that a difference arises in the amount of dark current collected in the photo-diode 13 and 14, can be solved.

Figure 11:
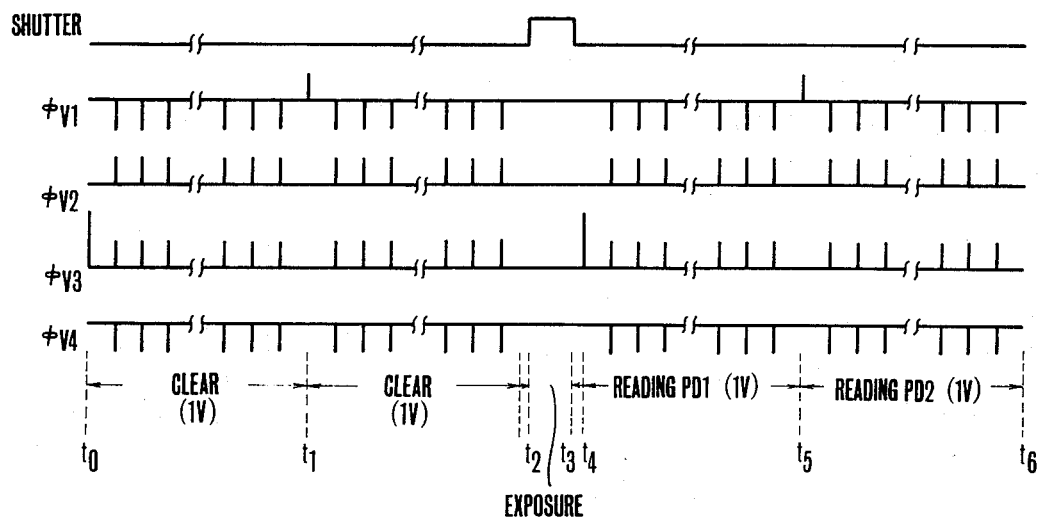
FIG. 11 is a diagram illustrating a third embodiment of this invention.

FIG. 11 is a diagram illustrating practice in accordance with a third embodiment of this invention. Whilst in the example of FIG. 10, the clearing of the electric charges in the photo-diodes 13 and 14 is performed by high speed transfer in the vertical direction, in the example of FIG. 11, practice is that in accompaniment with the actuation of the trigger button TR, the clearing of the electric charges of the photo-diodes 13 and 14 is not performed at the high speed but through one vertical period likewise as in the reading. Even in this embodiment, the time from the clearing of the electric charge of the photo-diode 13 at the time $t_0$ to the readout of the photo-diode 14 at the time $t_4$ becomes equal to the time from the clearing of the electric charge of the photo-diode 14 at the time $t_1$ to the readout at the time $t_5$. Therefore, a similar effect to the case of using the example of drive timing of FIG. 10 is obtained.

As has been described above, in the second and third embodiments, when reading a field, the electric charge clearing of the above-described photosensitive elements arrayed in the odd numbered rows in the above-described vertical direction and the above-described photosensitive elements arrayed in the even numbered rows are simultaneously performed, and means are provided such that when the above-described frame reading is performed, the electrical charge clearing of the above-described photosensitive elements arrayed in the odd numbered rows in the vertical direction and the above-described pohtosensitive elements arrayed in the even numbered rows are staggered by one vertical scanning period, so that the amount of dark current corrected in the photosensitive element can be equalized. Therefore, an advantage is produced that the flicker phenomenon is removed, and the dark current unevenness is made nearly of the same order.

What is claimed is:

1. An image pickup apparatus comprising:
   (a) image pickup means composed of a plurality of photo-electric transducer elements arrayed in rows and columns;
   (b) trigger means;
   (c) clearing means responsive to an output of said trigger means for clearing signals of a first group of rows of said image pickup means and signals of a second group of rows in sequence;
   (d) exposure means for exposing said image pickup means for an arbitrary time after the signals of the second group of rows have been cleared; and
   (e) readout means for reading out the signals of said first group of rows and the signals of said second group of rows in sequence after the end of exposure by said exposure means.

2. An apparatus according to claim 1, wherein the first group of rows and the second group of rows interlace each other.

3. An apparatus according to claim 1, wherein the clearing operation of said first group of rows and the clearing operation of said second group of rows are shifted in time from each other by a predetermined period, and wherein the reading out of said first group of rows and the reading out of said second group of rows are shifted in time from each other by said predetermined period.

4. An apparatus according to claim 3, wherein said clearing means clears the signals of the first group of rows and the signals of the second group of rows, each in said predetermined period.

5. An apparatus according to claim 3, wherein said clearing means clears the signals of the first group of rows and clears the signals of the second group of rows, each in a shorter time than said predetermined period.

6. An apparatus according to claim 1, wherein said exposure means includes a shutter for selectively entering light to said image pickup means.

7. An apparatus according to claim 1, wherein said processing means includes a clamp circuit.

8. An apparatus according to claim 1, further comprising recording means for recording the video signal formed by said processing means.

9. An apparatus according to claim 1, wherein said image pickup means includes an inter-line transfer CCD.

10. An apparatus according to claim 1, wherein said clearing means has a first mode for almost simultaneously clearing the signals of both said first group of rows and said second group of rows.

11. An apparatus according to claim 10, wherein said readout means has a second mode for almost simultaneously reading out the signals of both said first group of rows and said second group of rows.

12. An apparatus according to claim 11, wherein in said second mode, said readout means reads out the signals of said first group of rows and reads out the signals of said second group of rows after partially mixing said first and second groups of rows.

13. An apparatus according to claim 1, further comprising:
processing means for forming a video signal by using the signals readout by said readout means.

14. An apparatus according to claim 3, wherein said predetermined period corresponds to one vertical period.

15. An image pickup apparatus comprising:
(a) image pickup means composed of a plurality of photo-electric transducer elements arrayed in rows and columns;
(b) clearing means having a first mode in which signals of a first group of rows of said image pickup means and signals of a second group of rows thereof are cleared in sequence and a second mode in which they are cleared in the same period; and
(c) readout means for reading out the signals of said first group of rows and the signals of said second group of rows after the clearing operation by said clearing means.

16. An apparatus according to claim 15, wherein the first group of rows and the second group of rows interlace each other.

17. An apparatus according to claim 15, wherein in said first mode, the clearing operation of said first group of rows and the clearing operation of said second group of rows are shifted in time from each other by a predetermined period, and wherein in said first mode the reading out of said first group of rows and the reading out of said second group of rows are shifted in time from each other by said predetermined period.

18. An apparatus according to claim 15, wherein said clearing means in the first mode clears the signals of the first group of rows and the signals of the second group of rows each in said predetermined period.

19. An apparatus according to claim 15, wherein said clearing means in the first mode clears the signals of the first group of rows and the signals of the second group of rows in a shorter time than said predetermined period.

20. An apparatus according to claim 15, further comprising exposure means for exposing said image pickup means for an arbitrary time after the clearing operation by said clearing means and before the readout by said readout means.

21. An apparatus according to claim 20, wherein said exposure means includes a shutter.

22. An apparatus according to claim 15, further comprising processing means for forming a video signal by using the signals readout by said readout means.

23. An apparatus according to claim 22, further comprising recording means for recording the video signal formed by said processing means.

24. An apparatus according to claim 15, wherein said image pickup means includes an inter-line transfer CCD.

25. An apparatus according to claim 15, wherein said readout means has a third mode for almost simultaneously reading out the signals of said first group of rows and the signals of said second group of rows.

26. An apparatus according to claim 15 or 23, wherein said readout means has a further mode for reading out the signals of the first group of rows and the signals of the second group of rows in sequence.

27. An apparatus according to claim 25, wherein in said third mode, said readout means reads out the signals of said first group of rows and the signals of said second group of rows after partially mixing said first and second groups of rows.

28. An apparatus according to claim 17, further comprising:
processing means for forming a video signal by using the signals readout by said readout means.

29. An image pickup apparatus comprising:
(a) image pickup means composed of a plurality of photosensitive elements arranged in rows and columns;
(b) clearing means having a first mode for almost simultaneously clearing signals of odd numbered rows of photosensitive elements in said image pickup means, and signals of even numbered rows of photosensitive elements therein, and a second mode for clearing the signals of the odd numbered rows of photosensitive elements and the signals of the even numbered rows of photosensitive elements sequentially in one vertical period interval; and
(c) readout means for simultaneously or sequentially reading out the signals of said odd numbered rows and the signals of said even numbered rows in accordance with said first and second mode after the clearing operation by said clearing means.

30. An apparatus according to claim 24, wherein said readout means is arranged to read out the signals after mixing signals of the odd numbered rows and the signals of the even numbered rows, while mixing said odd numbered and even numbered rows in pairs, respectively.

31. An apparatus according to claim 29, further comprising:

exposure means for causing an optical image to be incident on said image pickup means only for an arbitrary time between said clear operation and said reading out operation.

32. An apparatus according to claim 32, wherein said exposure means includes a shutter.

33. An apparatus according to claim 24, wherein said image pickup means includes an inter-line transfer CCD.

* * * * *

UNITED STATES PATENT AND TRADEMARK OFFICE
CERTIFICATE OF CORRECTION

PATENT NO. : 4,866,528

DATED : September 12,1989

INVENTOR(S) : Yasuyuki Yamazaki, Akira Suga

It is certified that error appears in the above-identified patent and that said Letters Patent is hereby corrected as shown below:

```
Col. 1, line 24.   Change "is" to -- are --
Col. 1, line 25.   Change "are" to -- is --
Col. 2, line 11.   Change "clear" to -- clearing --
Col. 6, line 38.   Claim 26.  Change "23" to -- 25 --
Col. 7, line 3.    Claim 30.  Change "24" to -- 29 --
Col. 8, line 5.    Change "32" to -- 31 --.
```

Signed and Sealed this

Thirty-first Day of July, 1990

*Attest:*

HARRY F. MANBECK, JR.

*Attesting Officer*  *Commissioner of Patents and Trademarks*